Sept. 24, 1968   A. E. RILEY   3,402,472
EXTENSOMETERS
Filed Aug. 8, 1966   3 Sheets-Sheet 1

INVENTOR
AUBREY ELLIS RILEY
By Norris + Bateman
attys

Sept. 24, 1968     A. E. RILEY     3,402,472

EXTENSOMETERS

Filed Aug. 8, 1966     3 Sheets-Sheet 2

INVENTOR
AUBREY ELLIS RILEY

By Norris & Bateman
attys

Sept. 24, 1968  A. E. RILEY  3,402,472

EXTENSOMETERS

Filed Aug. 8, 1966  3 Sheets-Sheet 3

INVENTOR
AUBREY ELLIS RILEY
By: Norris + Bateman
Atty 3,402,472
EXTENSOMETERS
Aubrey Ellis Riley, Harrogate, England, assignor to Samuel Denison & Son Limited, York County, England, a British company
Filed Aug. 8, 1966, Ser. No. 570,895
13 Claims. (Cl. 33—147)

ABSTRACT OF THE DISCLOSURE

An extensometer comprises first and second pairs of parallel legs, each leg incorporating a respective abutment so that the pairs of abutments can be clamped in knife edge engagement on opposite sides of the specimen with a given gauge length between the first and second pairs of abutments, the legs of each pair being interconnected by tie rod assemblies which bear upon co-axially convex cylindrical surfaces one on each leg to preserve an approximately constant gap between the abutments in each pair during relative parallel movement in each pair of legs, separate transducers each responsive to relative movement between adjacent first and second legs to provide a measure of the movement and strain present on each side of the specimen which is substantially independent of the movement and strain present on the opposite side of the specimen.

---

This invention relates to extensometers for measurement of the alteration in the gauge length of a specimen subjected to tensile stress.

The majority of known extensometers are capable of accurate measurement of strain in a specimen only if the strain is equal on both sides of the median plane of the specimen parallel to the length being measured. If unequal strain is present on the two sides of the median plane the clamping of the extensometer to the specimen has been found to suffer slipping.

The present invention has for its object the provision of an extensometer which is capable of measuring the strain present on each of the two sides of the specimen and also the average of these strains, in conformity with the requirements of a "dual" extensometer as described in British standard specification No. 3,688.

The invention consists of an extensometer comprising first and second pairs of parallel legs, each leg incorporating a respective abutment so that the pairs of abutments can be clamped on opposite sides of the specimen with a given gauge length between the first and second pairs of abutments, the legs of each pair being interconnected by tie means which bear upon co-axially convex surfaces one on each leg to preserve an approximately constant gap between the abutments in each pair during relative parallel movement in each pair of legs, and means responsive to relative movement between adjacent first and second legs to provide a measure of the movement present on each side of the specimen which is substantially independent of the movement present on the opposite side of the specimen. Conveniently in the aforesaid extensometer according to the invention the tie means comprise pairs of tie bolts extending through clearance holes in the abutments, one bolt on each side of the specimen.

The pairs of abutments according to the invention can comprise pairs of knife edges for embedment in the specimen, or can comprise pairs of recessed elements for embracing an annular ridge on the specimen.

One example of the practical realisation of the invention is described with reference to the accompanying drawings wherein.

Figure 3:
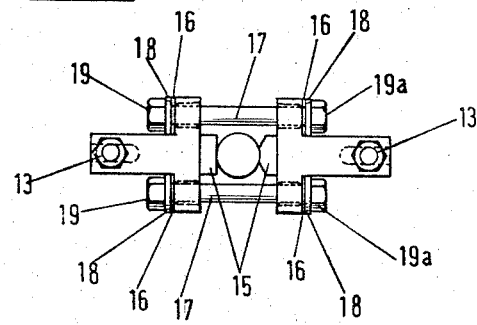
FIGURE 3 is a plan view of the upper parts only of FIGURE 1.

As shown in the drawings a first pair of vertically extending and horizontally spaced apart legs 10 comprises circular cross section rods 11 having respective abutments 12 of T-shape in plan view bolted at 13 upon the upper ends of the rods 11 so that the heads of the abutments extend horizontally parallel one on each side of the position of the vertical specimen 14. The connection of the abutments to the rods may provide for lateral adjustment of the former as appears in FIGURE 3.

The innermost faces of the abutments 12 (i.e. the face nearest the specimen) constitute horizontally extending knife edges 15 and the outermost faces 16 of the abutment heads are cylindrically shaped about an axis parallel and midway between the knife edges in their operative position.

The abutment heads have holes at right angles to their knife edges to receive generally horizontally extending tie bolts 17 so that washers 18 imposed between the tie bolt heads 19 at one end and nuts 19a at the other end of the bolts and the cylindrical outer faces 16 of the abutment heads bear upon the latter, whilst the bolts cause the knife edges 15 to embed into the specimen 14 in a given radial cross section of the specimen. The holes in the abutment heads 12 are a clearance fit about the tie bolts 17 in the vicinity of the cylindrical surfaces of the abutments and are relieved throughout the remainder of their lengths to permit limited angular movement of the tie bolts with respect to the abutments in a vertical plane.

Disposed between the first pair of legs 10 is a similar second pair of vertical legs 20 incorporating rods 21 carrying abutments 22 with knife edges 25 exactly as present in the first pair of legs 10 and disposed so that the knife edges 25 of the second pair of abutments 22 are beneath those 15 of the first pair 12 by a distance equal to the gauge length of the specimen. Also exactly as in the first pair of legs 10, the second pair of abutments 22 are bolted together by bolts 27 having washers 28, bolt heads 29 and nuts 29a bearing on cylindrically shaped outer surfaces 26 of the abutments.

Figure 1:
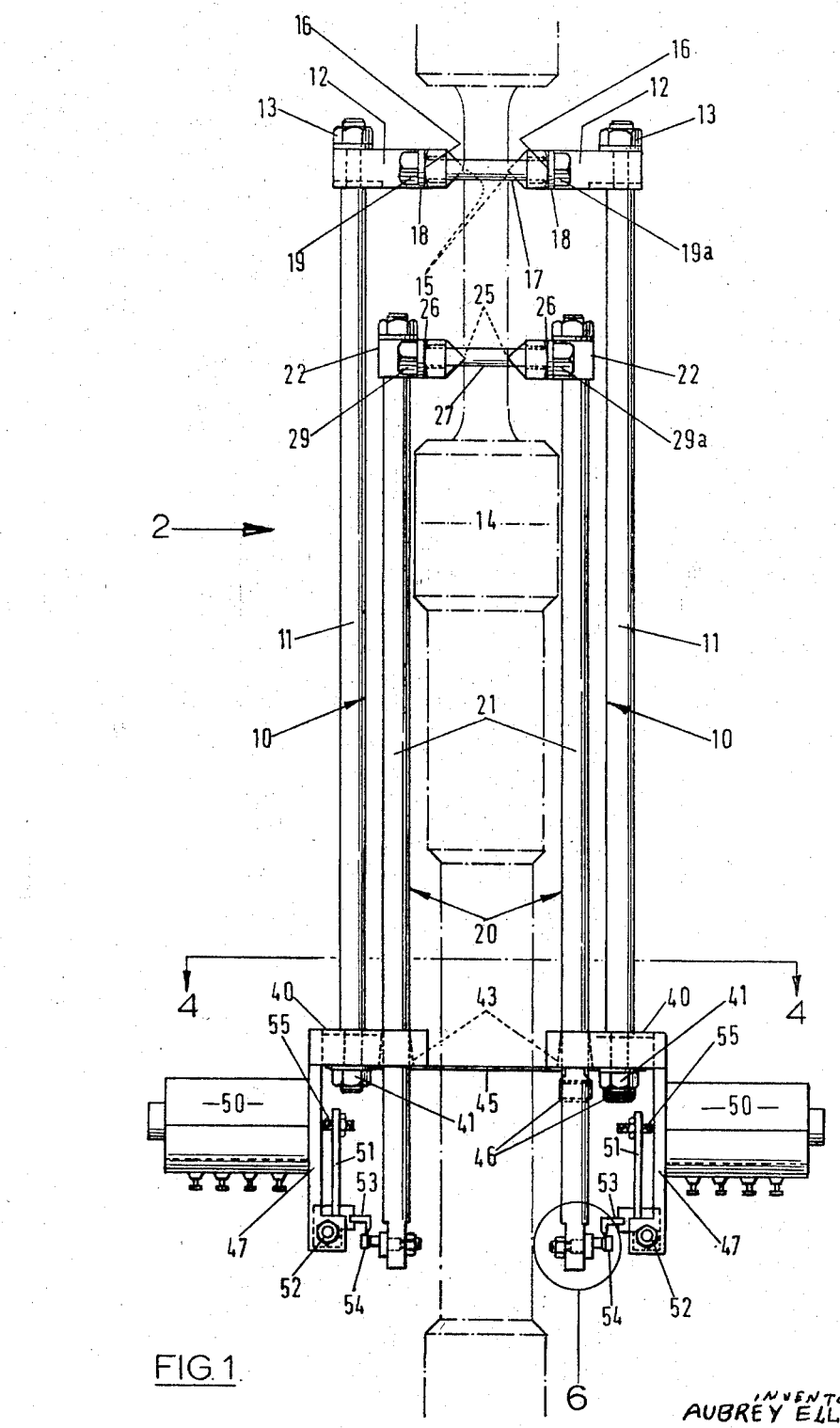
FIGURE 1 is a side elevation of an extensometer according to the invention.
Figure 2:
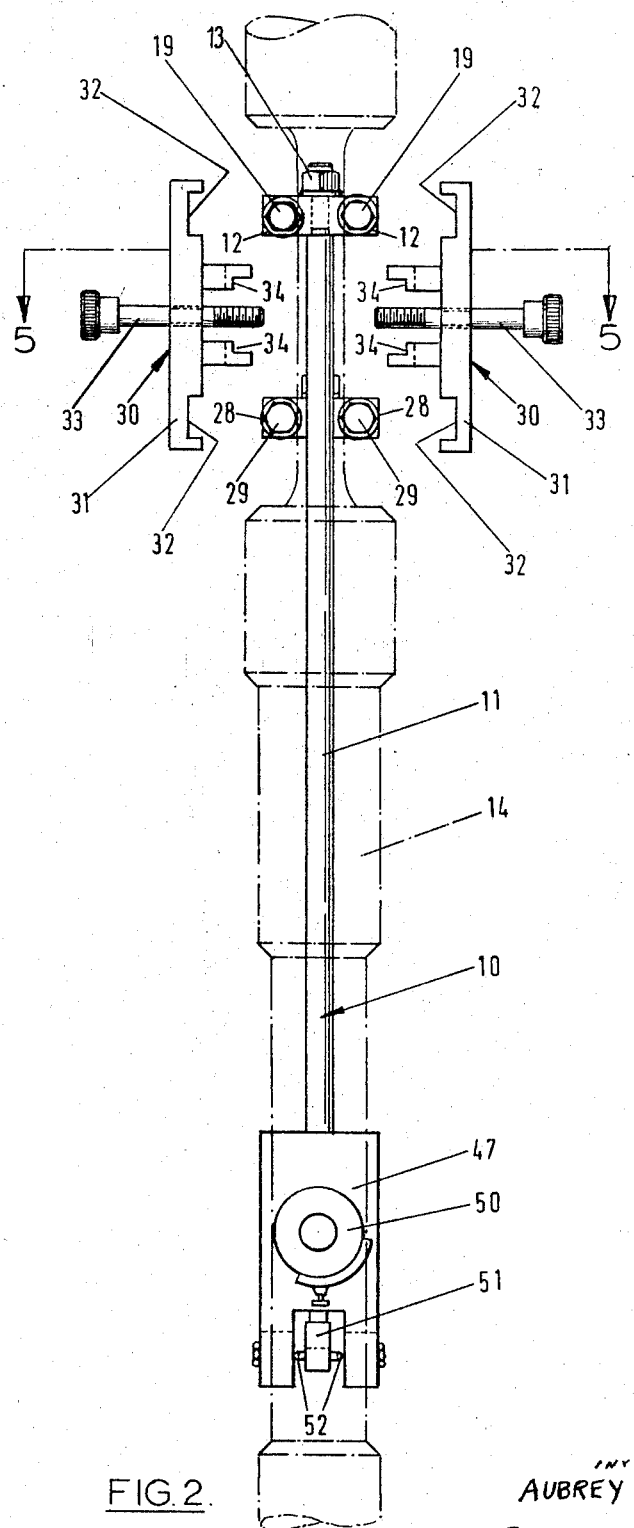
FIGURE 2 is a view in the direction 2 of FIGURE 1 with the addition of a jig.
Figure 5:
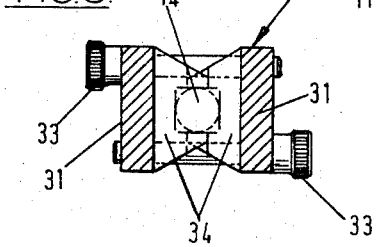
FIGURE 5 is a cross section on the line 5—5 of FIGURE 2 but showing the jig closed.

To facilitate accurate setting up of the above mentioned gauge length a jig 30 may be employed as exemplified in FIGURES 2 and 5 wherein the jig is shown in open and closed positions. This jig comprises a pair of jaws 31 each having a pair of recesses 32 spaced apart by the gauge length and adapted together with the recesses of the other jaw to embrace the tie bolts 17 and 27 and/or abutments 12 and 22 when the jaws are mutually secured by bolts 33 with the specimen 14 located between jawed lugs 34 as best shown in FIGURE 5.

A pair of inverted L-shape brackets 40 are bolted at 41 to the lower ends of the first pair of legs 10 and the rods 21 of the second pair of legs 20 extends through guide apertures 43 in the horizontally extending limbs 42 of the brackets to preserve the parallelism of the adjacent first and second legs. Preferably only the upper ends of these apertures 43 are a close but clearance fit about the rods 21 and their remaining lengths are appreciably relieved.

Figure 4:
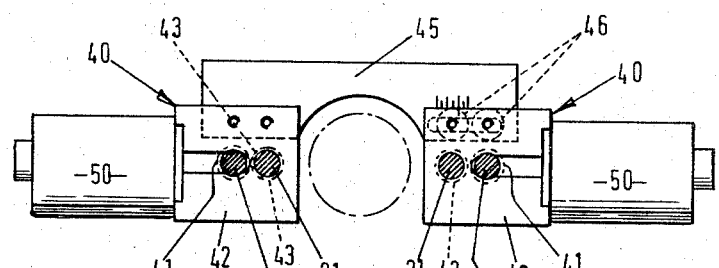
FIGURE 4 is a cross section on the line 4—4 of FIGURE 1.

A metal flexure strip 45 extends horizontally between the two brackets 40 to preserve the parallelism between the legs on each side of the specimen whilst permitting their relative movement to facilitate setting up, one end of the flexure strip can be adjustably connected to one of the brackets by set screws 46 passing through elongated holes in the strip with calibration of the parts as shown in FIGURE 4. The vertical limbs 47 of the brackets 40 carry transducers 50 responsive to relative vertical movement between the lower ends of the adjacent first and second legs 10 and 20. For example, a bell crank lever 51 pivoted at 52 in the vicinity of the lower end of each bracket bears at one end 53 on a lug 54 on each second leg 20 and bears at its opposite end 55 on a movement or pressure responsive element of an electrical transducer affording an output signal indicative of the relative movement between the first and second legs. Alternatively for example the transducer means can comprise a micrometer or Lamb's roller system as described and illustrated in FIGURES 70 and 71 of "Mechanical Testing of Metallic Materials" by R. A. Beaumont and published by Pitmans.

Figure 6:
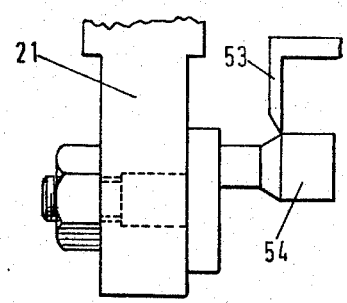
FIGURE 6 is a fragmentary view of the parts encircled at 6 in FIGURE 1 on an enlarged scale.

To facilitate setting up of the extensometer the lugs 54 (see FIGURE 6) can be eccentrically mounted on the second legs 20 and can be contoured so as to eliminate the input to the transducer if the extensometer tilts in relation to the specimen.

In use of the improved extensometer the two pairs of abutments 12 and 22 are clamped on opposite sides of the median plane of the specimen 14 with the given gauge length separating the two pairs of abutments. Upon application of tensile stress to the specimen, if the strain in the specimen is equal on both sides of the medium plane, equal increase in length of specimen obtains between the first and second abutments on each side of the specimen so that the abutments in each pair move together and an equal response is provided from both transducers 50. In the event of a greater strain being present on one side of the specimen than the other, the abutments in each pair are permitted relative movement by the ability of their tie bolts 17 and 27 to move in the heads of the abutments 12 and 22 whilst the co-axial cylindrical curvature of the outer surfaces 16 and 26 of these heads preserves a gap between the inner faces 16 of the abutments which is sufficiently constant for all practical purposes to prevent slipping between the abutments and specimen. By the provision for differential movement between the abutments on each side of the specimen, the two transducers are able accurately and independently to measure the strain present on each side of the specimen, whereas a combination of the transducer outputs provides a measure of the average elongation of the specimen. These several measurements can for example be fed to an indicator or recorder unit via a selector switch.

The above described extensometer is of particularly simple and rugged construction and as such is especially suited for the testing of specimens whilst heated in an oven.

In an alternative embodiment of the invention (not shown) the inner faces of the abutments 12 and 22 embody horizontally extending recesses designed to embrace diametrically opposite parts of a pair of annular ridges on the specimen separated by the required gauge length.

I claim:

1. An extensometer comprising a first pair of parallel legs, a first pair of opposed abutments mounted on the respective legs and adapted to clamp on opposite sides of a specimen to be tested, a second pair of parallel legs parallel to the first pair of legs with a leg of each pair being adjacent a leg on the other pair, a second pair of opposed abutments mounted on respective legs of said second pair and adapted to clamp on opposite sides of said specimen, said pairs of abutments clamping said specimen at longitudinally spaced regions that are a given gauge length apart, tie means extending between the abutments of each said pair of abutments for interconnecting the legs of each said pair of legs, means providing coaxially convex bearing engagement surfaces between each of said tie means and the associated pair of abutments for preserving an approximately constant gap between said abutments of each pair during relative parallel movement in each pair of legs, and metering means responsive to relative longitudinal movement between the adjacent first and second pair of legs for providing a measure of the strain present at each side of said specimen which is substantially independent of the strain present on the opposite side of the specimen.

2. An extensometer as defined in claim 1, wherein said metering means comprises a transducer mounted on each leg of one pair of said legs and operatively connected to the adjacent leg of the other pair to sense relative movement between the legs.

3. An extensometer as defined in claim 2, wherein each transducer is adapted to convert said relative movement to a proportionate electrical output signal.

4. An extensometer as defined in claim 2, wherein the connection between each transducer and said adjacent leg comprises a bell crank pivoted on the transducer mounting leg and having engagement with said adjacent leg by means shaped to vary said operative connection upon tilting of the extensometer relative to the specimen.

5. An extensometer as defined in claim 1, wherein each said leg comprises a vertical rod on which an abutment is secured to extend horizontally therefrom, and said convex bearing surfaces are formed on said abutments.

6. An extensometer as defined in claim 5, wherein said tie means for each pair of legs comprises tie bolt assemblies extending through apertures in the associated abutments and having substantially planar surface engagement with said convex surfaces.

7. An extensometer as defined in claim 1, wherein said convex surfaces are all substantially cylindrical with a common axis lying effectively in the longitudinal median plane of said specimen.

8. An extensometer according to claim 1 incorporating a substantially horizontal flexure strip interconnecting at least one pair of legs.

9. An extensometer according to claim 8 wherein the flexure strip connection embodies means providing for adjustment of the gap between the legs.

10. An extensometer according to claim 1 wherein at least one of the abutments of each pair is laterally adjustable with respect to its respective legs to permit adjustment of the gap between the legs in a pair of legs.

11. An extensometer according to claim 1 wherein each abutment incorporates a specimen engaging knife edge.

12. An extensometer according to claim 1 wherein each abutment incorporates a recessed inner face adapted to embrace an annular ridge on a specimen.

13. An extensometer according to claim 1, wherein said metering means comprises a transducer mounted on a bracket secured to one leg of a pair, the adjacent leg of the other pair extending through a guide aperture in said bracket.

References Cited

UNITED STATES PATENTS 2,301,872 11/1942 Henderson _____ 33—147
2,663,085 12/1953 Ruge _____ 33—147

SAMUEL S. MATTHEWS, *Primary Examiner.*